(12) United States Patent
Kawahito et al.

(10) Patent No.: US 7,707,568 B2
(45) Date of Patent: *Apr. 27, 2010

(54) COMPILER OPTIMIZATION

(75) Inventors: Motohiro Kawahito, Sagamihara (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1208 days.

This patent is subject to a terminal disclaimer.

(21) Appl. No.: 11/133,897

(22) Filed: May 20, 2005

(65) Prior Publication Data

US 2005/0268293 A1 Dec. 1, 2005

(30) Foreign Application Priority Data

May 25, 2004 (JP) .............................. 2004-154794

(51) Int. Cl.
 *G06F 9/45* (2006.01)
(52) U.S. Cl. ..................................................... 717/159
(58) Field of Classification Search ................. 717/144, 717/151, 153–159, 9, 131; 711/213; 712/226, 712/242

See application file for complete search history.

(56) References Cited

U.S. PATENT DOCUMENTS

| | | | | |
|---|---|---|---|---|
| 5,828,886 | A * | 10/1998 | Hayashi | 717/159 |
| 6,343,375 | B1 * | 1/2002 | Gupta et al. | 717/152 |
| 6,349,384 | B1 * | 2/2002 | Key et al. | 712/242 |
| 6,507,947 | B1 * | 1/2003 | Schreiber et al. | 717/160 |
| 7,386,839 | B1 * | 6/2008 | Golender et al. | 717/131 |
| 2002/0120923 | A1 * | 8/2002 | Granston et al. | 717/160 |
| 2005/0108695 | A1 * | 5/2005 | Li et al. | 717/144 |

FOREIGN PATENT DOCUMENTS

| | | |
|---|---|---|
| JP | 07-021032 | 1/1995 |
| JP | 2000-284970 | 10/2000 |

OTHER PUBLICATIONS

Cost-Effective Compilation Techniques for Java Just-in-Time Compilers.
Jianghai Fu. "Directed Graph Pattern Matching and Topological Embedding," Journal of Algorithms, 22 (2): 372-391, Feb. 1997.
S.S. Muchnick. Advanced Compiler Design and Implementation, Morgan Kaufmann Publishers, Inc., 1997.
Gupta et al. Finding Largest Subtrees and Smallest Subtrees, Algorithmica, vol. 21, No. 2, pp. 183-210, 1998.
Http://publibz.boulder.ibm.com/epubs/pdf/dz9zr002.pdf, pp. 7-180.

* cited by examiner

*Primary Examiner*—Tuan Anh Vu
(74) *Attorney, Agent, or Firm*—Louis P. Herzberg; Shimokaji & Associates, P.C.

(57) ABSTRACT

An optimization method that optimizes programs is disclosed. A pattern for multiple instructions is used to replace one of a plurality of partial programs with a replacement set of instructions. The partial program to be optimized is detected within a first set of instructions. The first set of instructions is transformed in the one of the plurality of partial programs and is replaced with the replacement set of instructions.

1 Claim, 14 Drawing Sheets

(a)

(b)

Figure 3
(a) 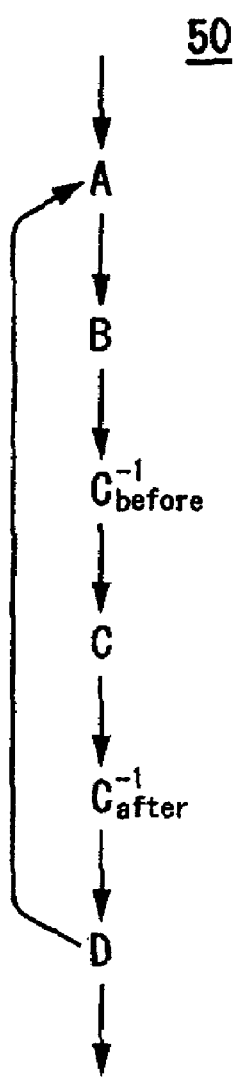
(b) 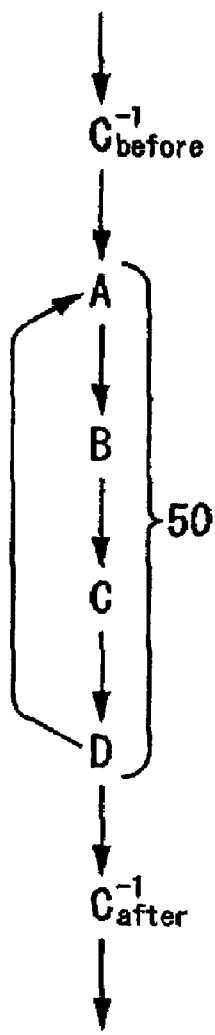

(a)

20

(b)

30

```
<Prepare table for TRT>
R1 = bytearray + i;
while(true) {
    if (i+256 <= bytearray.length) {
        TRT 0(256, R1), 0(table)         // TRT instruction
        if (nothing is found) {
            R1 += 256;
            i += 256;
        } else {
            i = R1 - bytearray;
            ch = load byte from R1;
            if (cond1) {
                <processing corresponding to cond1>;
            } else if (cond2) {
                <processing corresponding to cond2>;
            } else .....
            } else if (condN) {
                <processing corresponding to condN>;
            }
        }
    } else {
        // execute original loop
    }
}
```

(a)

40

```
ch = data[offset];
while(ch != GREATERTHAN) {
    if(ch == 0) return true;
    ch=data[++offset];
}
```

```
table = <address at which this transformation table exists>     — (1)
R1 = data + offset;                                              — (2)
while(true) {                                                    — (3)
    if (offset+256 <= data.length) {                             — (4)
        TRT 0(256, R1), 0(table)       // TRT instruction        — (5)
        if (zero flag is on)    {  // in a case where 0 or GREATERTHAN is not found
            R1 += 256;
            offset += 256;
        } else {                                                 — (6)
            offset = R1 - data;                                  — (7)
            ch = load byte from R1;                              — (8)
            if (ch == GREATERTHAN) {                             — (9)
                break;               // pass through loop
            } else {
                return true;         // pass through loop
            }
        }
    } else {
        // execute original loop
    }
}
```

(a)

40

```
count = 0;
while(true) {
    int b0 = bytes[offset];
    if (b0 < 0) break;
    offset++;
    count++;  // additional instruction
}
```

(b)

additional node

```
count = 0;
table = <address at which this transformation table exists>    — (1)
R1 = bytes + offset;                                           — (2)
while(true) {                                                  — (3)
    if (offset+256 <= bytes.length) {                          — (4)
        TRT 0(256, R1), 0(table)         // TRT instruction    — (5)
        if (zero flag is on)   { // in a case where target data is not found
            R1 += 256;
            offset += 256;
            count += 256;
        } else {                                               — (6)
            T_offset = R1 - data;                              — (7)
            T_inccount = T_offset-offset;
            count += T_inccount;
            offset = T_offset;
            b0 = load byte from R1;                            — (8)
            break;              // pass through loop           — (9)
        }
    } else {
        // execute original loop
    }
}
```

```
count = 0;
while(true) {
    int b0 = bytes[offset];
    if (b0 < 0) break;
    offset++;
    a[count++] = 0;   // additional instruction
}
```

```
count = 0;
table = <address at which this transformation table exists>
R1 = bytes + offset;
while(true) {
    if (offset+256 <= bytes.length &&
        count+256 <= a.length) {
        TRT 0(256, R1), 0(table)      // TRT instruction      – (1)
        if (zero flag is on)    {  // in a case where target data is not found
            R1 += 256;
            offset += 256;
            for (T = 0; T < 256; T++) {                        – (2)
                a[count++] = 0;
            }
        } else {
            T_offset = R1 - data;
            T_inccount = T_offset-offset;
            for (T = 0; T < T_incount; T++) {                  – (3)
                a[count++] = 0;
            }
            offset = T_offset;
            b0 = load byte from R1;
            break;                    // pass through loop
        }
    } else {
        // execute original loop
    }
}
```

(b)                                                                                      60

```
count = 0;
table = <address at which this transformation table exists>
R1 = bytes + offset;
while(true) {
    if (offset+256 <= bytes.length &&
        count+256 <= a.length) {
        TRT 0(256, R1), 0(table)      // TRT instruction                    – (1)
        if (zero flag is on)    {  // in a case where target data is not found
            R1 += 256;
            offset += 256;
            T = a + count ;
            XC 0(256, T), 0(T) // clear memory through 256 bytes            – (2)
            count += 256 ;
        } else {
            T_offset = R1 - data;
            T_inccount = T_offset-offset;
            T = a + count ;
            XC  0(T_inccount, T), 0(T) // (clear memory through T_Incount bytes  – (3)
            count += T_inccount ;
            offset = T_offset;
            b0 = load byte from R1;
            break;                    // pass through loop
        }
    } else {
        // execute original loop
    }
}
```

(a)

40

```
output = 0;
for (i = 0; i < 64; i++) {
    if (input & 1) output++;
    input >>= 1;
}
```

```
w = input;
w = w - ((w >> 1) & 0x5555555555555555);
t = ((w >> 2) & 0x3333333333333333);
w = (w & 0x3333333333333333) + t;
w = (w + (w >> 4)) & 0x0F0F0F0F0F0F0F0F;
w = w + (w << 8);
w = w + (w << 16);
w = w + (w << 32);
output = w >> 56;
```

Figure 14

| Number of rounds through loop (Number of times scan is actually made) | Speed ratio when the speed of original program is 1 |
|---|---|
| 1 | 0. 2224667 |
| 2 | 0. 3242737 |
| 4 | 0. 6574717 |
| 6 | 0. 9270553 |
| 8 | 1. 05918 |
| 10 | 1. 0853057 |
| 13 | 1. 476548 |
| 16 | 1. 601552 |
| 32 | 2. 9965507 |
| 64 | 4. 7436817 |
| 128 | 8. 1364077 |
| 256 | 12. 66899 |

COMPILER OPTIMIZATION

FIELD OF THE INVENTION

The present invention relates to a compiler, an optimization method, a compiler program, and a recording medium. In particular, the present invention relates to a compiler, an optimization method, a compiler program, and a recording medium that replace an instruction arrangement pattern that is known to be optimizable with a target instruction sequence corresponding to the arrangement pattern.

BACKGROUND

There has been proposed a technique of detecting an instruction sequence matching a predetermined pattern from a program to be optimized and replacing the instruction sequence with another instruction sequence determined in advance in accordance with the pattern. This technique can optimize a program, for example, by replacing a sequence of instructions for performing a certain kind of processing with a single instruction producing the same processing result as the processing performed by the sequence of instructions. The instruction which replaces the sequence of instructions is, for example, a TRT instruction in the S/390 architecture provided by IBM Corporation.

The following are documents are referred to and/or considered with respect to an embodiment:

[Non-Patent Document 1]
Jianghai Fu. Directed graph pattern matching and topological embedding. Journal of Algorithms, 22(2):372-391, February 1997.

[Non-Patent Document 2]
S. S. Muchnick. Advanced compiler design and implementation, Morgan Kaufmann Publishers, Inc., 1997.

[Non-Patent Document 3]
Arvind Gupta and Naomi Nishimura. Finding Largest Subtrees and Smallest Supertrees, Algorithmica, Vol. 21, No. 2, pp. 183-210, 1998

[Non-Patent Document 4]
http://publibz.boulder.ibm.com/epubs/pdf/dz9zr002.pdf, pp. 7-180

A TRT instruction is an instruction to scan a predetermined storage area in order from the top and output an address or the like at which a value satisfying a predetermined condition is stored (see Non-Patent Document 4). FIG. 16 is a control flow graph corresponding to processing according to a TRT instruction. The processing by means of the TRT instruction corresponds to a sequence of processing steps by which values stored in a storage area byte array are read out in order from the top of the storage area to a variable ch, and which ends when one of conditions cond1 to condN is satisfied. A compiler may replace such a processing sequence with a single TRT instruction to optimize a program.

Disclosure of the invention and problems solved by the invention:

However, it is rare that a program to be optimized completely matches a predetermined pattern. If such a match does not occur, optimization is abandoned in the conventional art. Therefore there has been a possibility of failure to effectively utilize an instruction such as a TRT instruction specific to an architecture.

It is, therefore, an object of the present invention to provide a compiler, an optimization method, a compiler program, and a recording medium as a solution to the above-described problem. This object can be attained by a combination of features described in the independent claims in the appended claims. In the dependent claims, further advantageous examples of the present invention are specified.

SUMMARY OF THE INVENTION

To solve the above-described problem, according to a first aspect of the present invention, there is provided a compiler detecting a pattern that is to be replaced. The compiler includes multiple predetermined instructions in a program to be optimized, and replaces the detected pattern to be replaced with a target instruction sequence determined in accordance with the instruction sequence to be replaced.

The compiler has: a target partial program detecting unit for detecting, from among partial programs of the program to be optimized, a partial program including instructions corresponding to all instructions included in the pattern to be replaced, as a partial program to be optimized; an instruction sequence transforming unit for transforming, in the partial program to be optimized, instructions other than those instructions corresponding to instructions included in the pattern to be replaced and those instructions having execution dependencies different from the pattern to be replaced so that dependencies between instructions included in the partial program to be optimized match the pattern to be replaced; and an instruction sequence replacing unit for replacing the partial program to be optimized transformed by the instruction sequence transforming unit with the target instruction sequence determined in accordance with the pattern to be replaced. Thus, the present invention allows architecture-specific instructions to be used effectively.

BRIEF DESCRIPTION OF THE DRAWINGS

The foregoing and other aspects of these teachings are made more evident in the following detailed description of the invention, when read in conjunction with the attached drawing figures, wherein:

FIG. 3 shows a concrete example of the partial program 40 to be optimized and a partial program 50 to be optimized corresponding to FIG. 2(e);

FIG. 7 shows a resultant partial program 60 in the first example;

FIG. 9 shows the resultant partial program 60 in the second example;

FIG. 10 shows a third example of the partial pattern 40 to be optimized by the compiler 10;

FIG. 11 shows the resultant partial program 60 in the third example;

FIG. 13 shows the resultant partial program 60 in the fourth example;

FIG. 14 is a diagram for explaining the effect of the embodiment;

DESCRIPTION OF SYMBOLS

Figure 1:
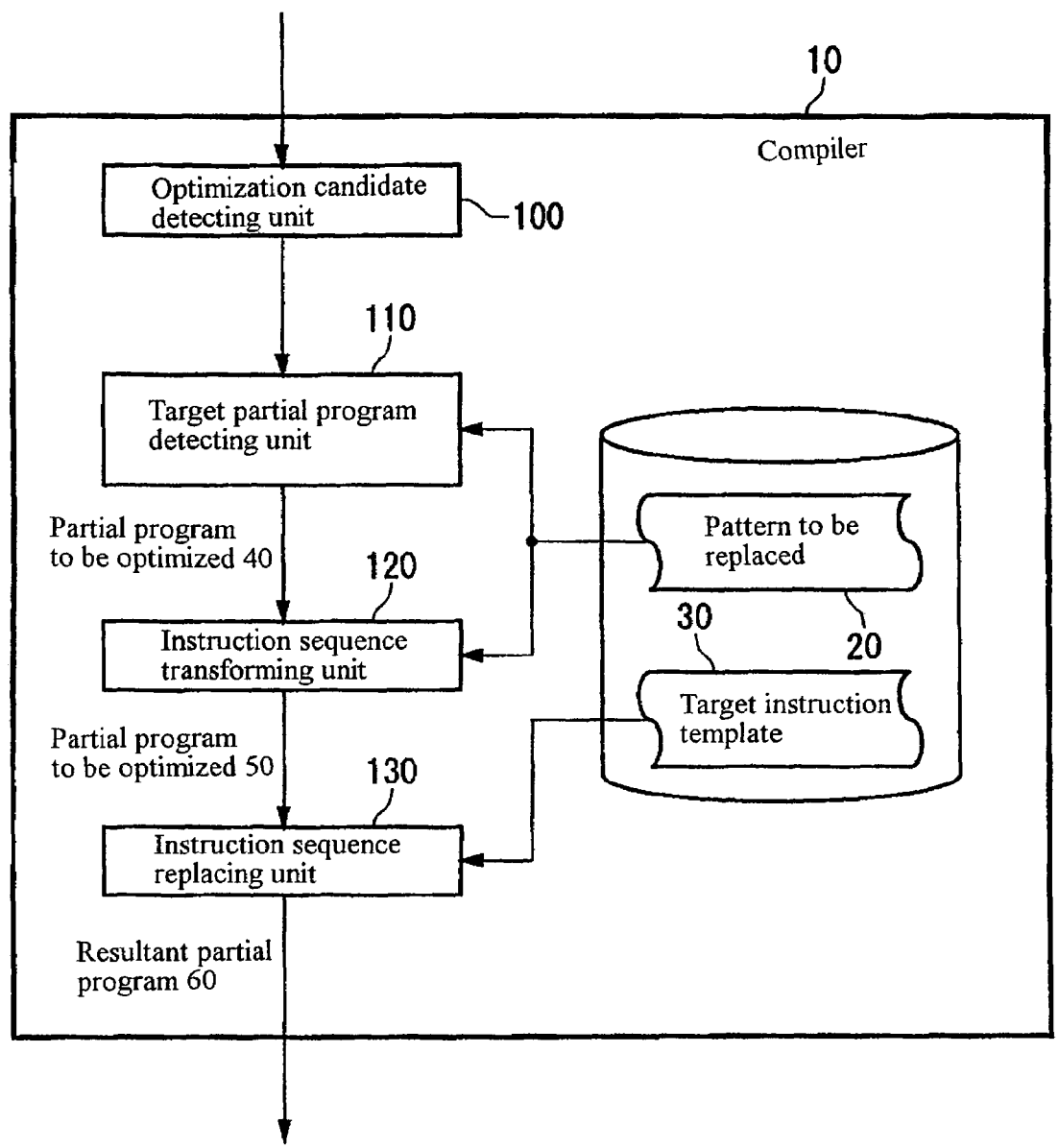
FIG. 1 is a functional block diagram of a compiler 10.

10 . . . Compiler
20 . . . Pattern to be replaced
30 . . . Target instruction template
40 . . . Partial program to be optimized
50 . . . Partial program to be optimized
60 . . . Resultant partial program
100 . . . Optimization candidate detecting unit
110 . . . Target partial program detecting unit
120 . . . Instruction sequence transforming unit
130 . . . Instruction sequence replacing unit

DETAILED DESCRIPTION OF THE INVENTION

The present invention provides a compiler detecting a pattern that is to be replaced and includes multiple predetermined instructions in a program to be optimized, and replacing the detected pattern to be replaced with a target instruction sequence determined in accordance with the instruction sequence to be replaced, the compiler having a target partial program detecting unit for detecting, from among partial programs of the program to be optimized, a partial program including instructions corresponding to all instructions included in the pattern to be replaced, as a partial program to be optimized, an instruction sequence transforming unit for transforming, in the partial program to be optimized, instructions other than those instructions corresponding to instructions included in the pattern to be replaced and those instructions having execution dependencies different from the pattern to be replaced so that dependencies between instructions included in the partial program to be optimized match the pattern to be replaced, and an instruction sequence replacing unit for replacing the partial program to be optimized transformed by the instruction sequence transforming unit with the target instruction sequence determined in accordance with the pattern to be replaced.

It is noted that not all the necessary features of the invention are listed. Subcombinations of the features can also constitute the present invention. The present invention allows architecture-specific instructions to be used effectively.

Advantageous Embodiments

The present invention will be described with respect to embodiments thereof. The embodiment described below, however, is not limited the invention set forth in the appended claims, and all combinations of features described in the description of the embodiment are not necessarily indispensable to the solution according to the present invention.

FIG. 1 is a functional block diagram of a compiler 10. The compiler 10 detects a pattern which is to be replaced and which has multiple predetermined instructions, and replaces the detected pattern to be replaced with a target instruction sequence determined in accordance with the pattern to be replaced. The target instruction sequence is an instruction sequence that is executed more efficiently than the pattern to be replaced and includes, for example, an architecture-specific high-speed instruction. That is, the purpose is to optimize the program to be optimized into an instruction sequence which is executed more efficiently.

The compiler 10 has an optimization candidate detecting unit 100, a target partial program detecting unit 110, an instruction sequence transforming unit 120, and an instruction sequence replacing unit 130. The optimization candidate detecting unit 100 detects a candidate for a partial program which is an object to be optimized. For example, the optimization candidate detecting unit 100 detects, in a program to be optimized, a partial program including a memory access instruction to access the same type of data as data to be accessed according to a memory access instruction included in the pattern to be replaced. The partial program may be a processing unit of the program called a method, a function or a procedure, or may be an instruction sequence such as loop processing determined on the basis of a characteristic of a control flow.

The partial program detecting unit 110 detects as a partial program 40 to be optimized a partial program similar to a pattern 20 to be replaced in multiple partial programs detected by the optimization candidate detecting unit 100. For example, the partial program detecting unit 110 detects as partial program 40 a partial program including instructions corresponding to all instructions included in the pattern 20. More specifically, the partial program detecting unit 110 determines, with respect to two instructions, that the instructions correspond to each other if the processing details according to the instructions are identical to each other, if the number of control flows output from the instructions are equal to each other, and if instructions at transition destinations of the control flows are identical to each other.

The instruction sequence transforming unit 120 transforms, in the partial program 40, instructions other than those instructions corresponding to instructions included in the pattern 20 and those instructions having execution dependencies different from the pattern to be replaced so that dependencies between instructions included in the partial program 40 match the pattern 20. The instruction sequence transforming unit 120 may transform other instructions if necessary. The transformed partial program to be optimized is set as a partial program 50 to be optimized.

The instruction sequence replacing unit 130 replaces the partial program 50 transformed by the instruction sequence transforming unit 120 with a target instruction sequence determined in accordance with the pattern 20. For example, the compiler 10 generates a target instruction sequence by replacing each variable in a target instruction template 30 showing the structure of the target instruction sequence with a corresponding variable in the partial program 50. As a result, the compiler 10 outputs as a resultant partial program 60 the program to be optimized including the target instruction sequence.

FIG. 2(a) shows a concrete example of the pattern 20. The pattern 20 has an instruction A, an instruction B, an instruction C and an instruction D. The pattern 20 determines execution dependencies between the instruction A, instruction B, instruction C and instructions. The execution dependencies between the instructions are, for example, control flows between the instructions. According to the control flows, the instruction B is executed after execution of the instruction A, the instruction C is executed after execution of the instruction B, and the instruction D is executed after execution of the instruction C. The instruction A is again executed after execution of the instruction D.

The pattern 20 may alternatively determine control dependences or data dependences between instructions. Also, the pattern 20 may be a PDG (program dependence graph) which is a dependence graph determining both control dependences and data dependences. That is, the pattern 20 may be a dependence graph having as a node each of multiple instructions included in the pattern 20 and having directed edges representing execution dependences between multiple instructions.

FIG. 2(b) shows a first example of the partial program 40. This partial program includes instruction A, instruction B, instruction C, instruction D and instruction A. Accordingly, this partial program includes instructions corresponding to all the instructions included in the pattern 20. The target partial program detecting unit 110 therefore detects this partial program as the partial program 40.

Thus, in a case where the pattern 20 determines recurring dependences between instructions, the target partial program detecting unit 110 can detect, as the partial program 40, an instruction sequence having dependencies which are the same as those determined by the pattern to be replaced 20 but differ in recurrence phase.

In this case, the instruction sequence replacing unit 130 replaces the partial program 40 with the target instruction sequence, without the partial program 40 being transformed by the instruction sequence transforming unit 120. The target partial program detecting unit 110 may detect, as well as this example of instruction sequence, as the partial program 40 to be optimized, an instruction sequence having dependences which are the same as those determined by the pattern 20 and which appear in the same recurrence phase (a completely matching sequence). Also in this case, the instruction sequence replacing unit 130 replaces the partial program 40 with the target instruction sequence, without the partial program 40 being transformed by the instruction sequence transforming unit 120.

FIG. 2(c) shows a second example of the partial program 40. This partial program includes instruction A, instruction B, instruction C and instruction D. Accordingly, this partial program includes instructions corresponding to all the instructions included in the pattern 20. The target partial program detecting unit 110 therefore detects this partial program as the partial program 40. Thus, the target partial program detecting unit 110 can detect, as the partial program 40, a partial program including an instruction sequence executed in a certain order different from that of the execution dependences in the pattern 20.

In this case, the instruction sequence transforming unit 120 changes the order of execution of the instructions in the partial program 40 on the basis of the dependences on condition that the results of processing by the partial program 40 are not changed after changing the order of execution of the instructions in the partial program 40. More specifically, the instruction sequence transforming unit 120 interchanges the positions of the instruction B and the instruction C in the execution order if the instruction B does not depend on the result of processing according to the instruction C. The partial program 50 is thereby produced. The instruction sequence replacing unit 130 replaces the partial program 50 changed in instruction execution order, with the target instruction sequence.

FIG. 2(d) shows a third example of the partial program 40. This partial program includes instruction A, instruction B, instruction C, instruction D and instruction E. Accordingly, this partial program includes instructions corresponding to all the instructions included in the pattern 20. The target partial program detecting unit 110 therefore detects this partial program as the partial program 40. Thus, the target partial program detecting unit 110 can detect, as the partial program 40, a partial program including in loop processing an additional instruction E which does not correspond to any of the an instructions included in the pattern 20.

In this case, the instruction sequence transforming unit 120 makes a transformation such that the additional instruction is executed out of the loop processing, on condition that the result of execution of the additional instruction included in the loop processing of the partial program 40 is constant independently of repetition of the loop processing. Alternatively, the instruction sequence transforming unit 120 may divide the loop processing of the partial program 40 into two loop processings in which the additional instruction and the instruction sequence other than the additional instruction are respectively executed. Division of loop processing will not be described since it is well known from Non-Patent Document 2. The instruction sequence replacing unit 130 replaces the loop processing from which the additional instruction has been removed with the target instruction sequence.

Figure 2:
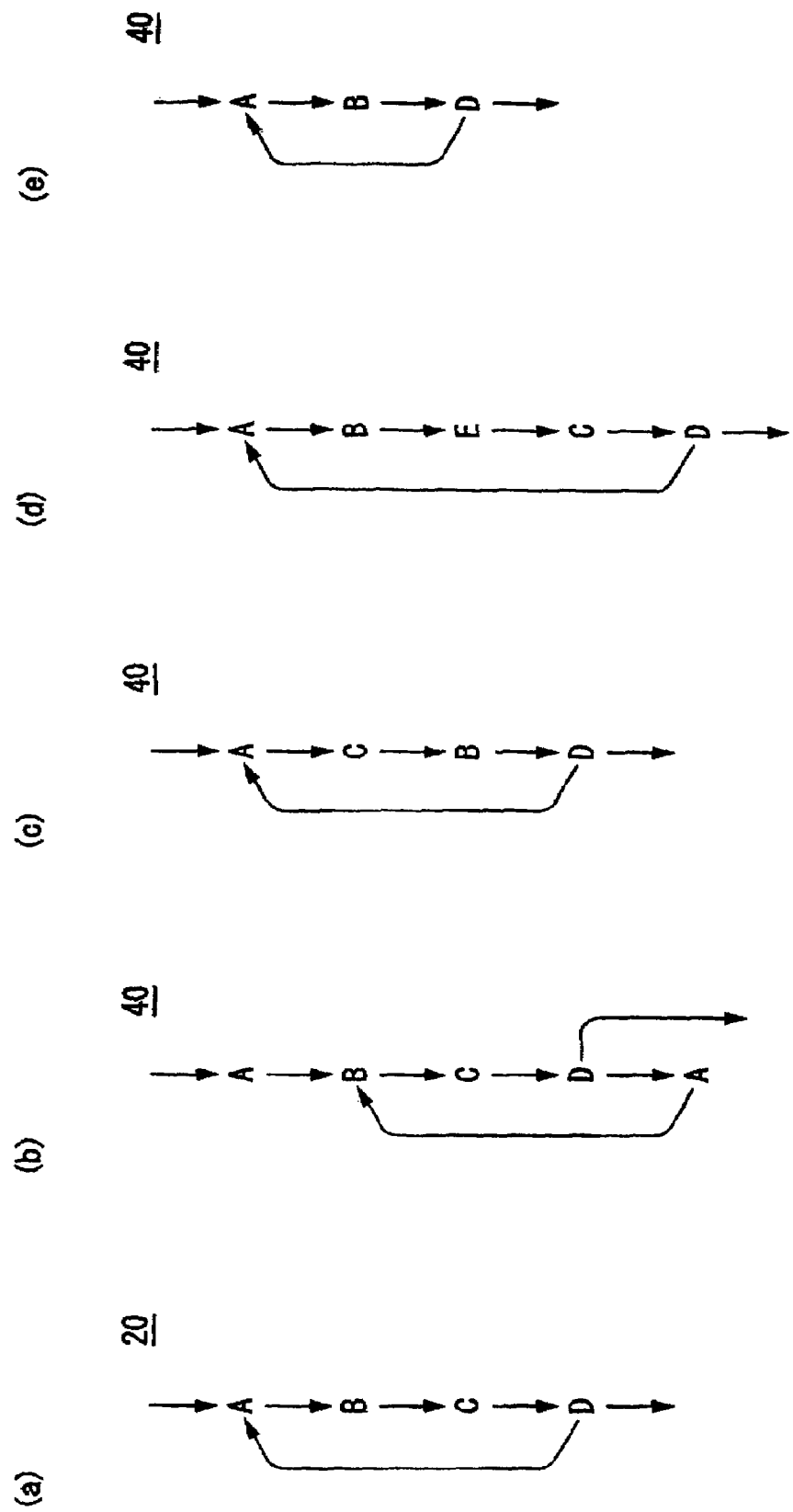
FIG. 2 shows a concrete example of a pattern 20 to be replaced and a partial program 40 to be optimized.

FIG. 2 shows a fourth example of the partial program 40. This partial program includes instruction A, instruction B and instruction D. This partial program lacks some of the instructions included in the pattern 20 (i.e., instruction C). In this case, the target partial program detecting unit 110 first computes the proportion of the instructions in the partial program corresponding to the other instructions included in the pattern 20 in all the instructions included in the pattern 20. The target partial program detecting unit 110 then detects the partial program as the partial program 40, on condition that the computed proportion is higher than a predetermined reference proportion. Processing in this case will be described with reference to FIG. 3.

FIG. 3 shows a concrete example of the partial program 40 and the partial program 50 corresponding to FIG. 2(e). The instruction sequence transforming unit 120 adds to the partial program 40 the instruction C which is the absent instruction absent in the instructions in the partial program 40 corresponding to all the instructions included in the pattern 20. The instruction sequence transforming unit 120 generates a cancel instruction to return the result of processing of the partial program 40 changed by the addition of the absent instruction to the processing result obtained in the case where the absent instruction is not added. Instruction $C^{-1}$ represents this cancel instruction. The instruction sequence transforming unit 120 may generate a set of two instructions respectively executed before and after the instruction C to cancel out the effect of the addition. Instruction $C^{-1}_{before}$ and instruction $C^{-1}_{after}$ represent these instructions.

For example, the instruction sequence transforming unit 120 generates as instruction $C^{-1}_{before}$ a save instruction to save, before the instruction C, the value in a storage area in which the result of processing according to the instruction C is stored. The instruction sequence transforming unit 120 also generates as instruction $C^{-1}_{after}$ a recovery instruction to recover the value in the storage area after execution of the instruction C. FIG. 3(a) shows the generated partial program 50. The instruction sequence transforming unit 120 makes a transformation such that the save instruction and the recovery instruction are executed out of the generated partial program 50 to be optimized. FIG. 3(b) shows the transformed partial program 50. In this case, the instruction sequence replacing unit 130 replaces the partial program 50 including the instruction C with the target instruction sequence.

Preferably, the target partial program detecting unit 110 computes, with respect to each of partial programs, an estimate of the processing time increased in a case where an absent instruction and a save instruction or the like to the partial program. The target partial program detecting unit 110 also computes an estimate of the reduced processing time in a case where the partial program is replaced with the target instruction sequence by the instruction sequence replacing unit 130. The target partial program detecting unit 110 then detects the partial program as the partial program to be optimized, if the increased processing time is shorter than the reduced processing time, thus optimizing only the portion transformable to improve the efficiency.

Further, for example, in a case where a comparison instruction included in the pattern 20 and a comparison instruction included in the partial program 40 differ only in a variable to be compared, the instruction sequence transforming unit 120 may change only a constant, with which the variable is to be compared, in the comparison instruction included in the partial program 40. For example, in a case where the pattern 20 includes an instruction "switch (ch)" and the partial program 40 includes an instruction "switch (ch+1)", the instruction sequence transforming unit 120 makes a transformation by reducing 1 from a constant of a case statement in the partial program 40. The instruction sequence transforming unit 120 transforms the instruction "switch (ch+1)" in the partial program 40 into the instruction "switch (ch)". Consequently, the instruction sequence replacing unit 130 can match the instruction included in the partial program 40 to the pattern 20.

Figure 4:
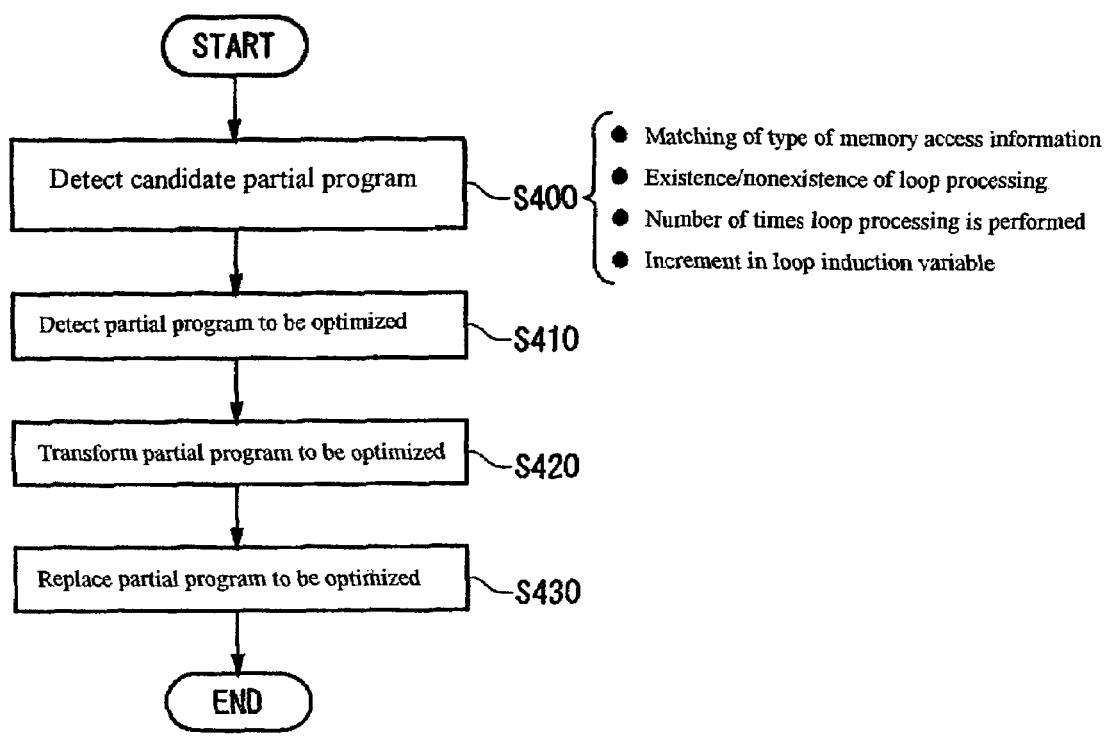
FIG. 4 is a flowchart showing a process in which the compiler 10 optimizes the program to be optimized.

FIG. 4 is a flowchart showing a process in which the compiler 10 optimizes a program to be optimized. The optimization candidate detecting unit 100 detects a partial program as a candidate to be optimized (S400). Description will be made of a concrete example.

For example, the optimization candidate detecting unit 100 first detects, as a candidate to be optimized, a partial program including a memory access instruction to access the same type of data as data to be accessed according to a memory access instruction included in the pattern 20.

For example, in a case where the pattern 20 includes a load instruction, the optimization candidate detecting unit 100 determines that a partial program is a candidate to be optimized, on condition that the partial program includes the load instruction. Similarly, in a case where the pattern 20 includes a store instruction, the optimization candidate detecting unit 100 determines that a partial program is a candidate to be optimized, on condition that the partial program includes the store instruction. Types of data to be accessed include types indicating kinds of data (an array variable, an instance variable, and a class variable) as well as "byte", "int", "float" and "double" which are types indicating ranges of data expression.

In a case where the pattern 20 includes loop processing, the optimization candidate detecting unit 100 detects a partial program including loop processing as a candidate for a partial program to be optimized. The loop processing is an instruction sequence corresponding to strongly connected components in a case where the program is expressed as a control flow graph. Also, the optimization candidate detecting unit 100 detects a partial program as a candidate to be optimized, further on condition that the partial program includes loop processing having the same increment in a loop induction variable as that in the loop processing included in the pattern 20.

Also, the optimization candidate detecting unit 100 may detect a partial program as a candidate to be optimized, further on condition that the loop processing is repeated a number of times equal to or larger than a predetermined reference number of times. The above-described processing narrows down the range in which optimization is tried, thus reducing the processing time required for compilation. As a result, the facility with which the technique described with respect to this embodiment is applied to a dynamic compiler such as a just-in-time compiler.

Preferably, in a case where an optimization level indicating the degree of optimization needed by a user is set, the optimization candidate detecting unit 100 changes, according to the optimization level, a criterion for detection of a candidate to be optimized. For example, in a case where a higher optimization level is set, the optimization candidate detecting unit 100 detects a larger number of partial programs as a candidate to be optimized in comparison with that in a case where a lower optimization level is set. Further, the optimization candidate detecting unit 100 may omit processing in S400, for example, depending on a setting made by the user.

Subsequently, the target partial program detecting unit 110 detects, as a partial program to be optimized, a partial program including instructions corresponding to all the instructions included in the pattern 20 in the partial programs detected as a candidate to be optimized (S410). A concrete example of this processing will be described with respect to a case where the pattern 20 includes loop processing. The target partial program detecting unit 110 determines the correspondence between instructions with respect to instructions in the loop processing and makes no determination as to coincidence between dependences. On the other hand, the target partial program detecting unit 110 determines not only the correspondence between instructions but also the coincidence between dependences with respect to instructions out of the loop processing.

That is, if the target partial program detecting unit 110 determines, with respect to each of the partial programs, that the partial program includes in the loop processing the instructions corresponding to all the instructions included in the loop processing, and that all the instructions out of the loop processing in the partial program conform to the dependences determined by the pattern 20, it detects the partial program as a program to be optimized. In this way, loops etc. having the same dependences but differing in recurrence phase can be suitably detected.

Description will be made of further details. The target partial program detecting unit 110 first generates a dependence graph in which each of multiple instructions included in each of the partial programs is set as a node and execution dependences between multiple instructions are represented by directed edges. The target partial program detecting unit 110 then makes a determination as to correspondence in the form between the generated dependence graph and the dependence graph indicating the pattern 20, by means of an algorithm for determination as to graph form correspondence.

The target partial program detecting unit 110 may detect the same type of dependence graph as the pattern 20, for example, by the topological embedding technique described in Non-Patent Document 1. Alternatively, the target partial program detecting unit 110 may detect the dependence graph corresponding in form to the pattern 20, by detecting a piece of program having the largest common portion in common with the pattern 20 on the basis of the method described in Non-Patent Document 2. Each of these techniques allows determination of correspondence in the form even in a case where an arbitrary node is included between the nodes in the dependence graph of the pattern 20. Therefore, the instruction sequence shown in FIG. 2(d) can be detected as a partial program to be optimized.

Also, the dependence graph with respect to loop processing is handled as a tree structure extending infinitely. Then, with respect to (b), A->B->C->D->A->B->C-> . . . is determined to find correspondence in the form. With respect to (c), the loop is developed to obtain A->C->B->D->A->C->B->D-> A . . . . This algorithm allows an arbitrary node to be included between the nodes, as mentioned above. Thus, the underlined portions are connected to A->B->C->D. Therefore, correspondence in the form to the pattern is also determined with respect to this structure.

Thus, when the target partial program detecting unit 110 determines, with respect each of the partial programs, that the instructions in the partial program corresponding to all the instructions included in the pattern 20 are executed in the execution order designated by the execution dependences between the instructions in the pattern 20, it can detect the partial program as a partial program to be optimized. In this way, each of the instruction sequences shown in FIGS. 2(*b*), 2(*c*), and 2(*d*), for example, can be detected as a partial program to be optimized.

The topological embedding technique may be extended by a method described below to enable the target partial program detecting unit 110 to detect the instruction sequence shown in FIG. 2(*d*) as a partial program to be optimized. More specifically, in the topological embedding algorithm, a portion which determines that a partial program lacks a node corresponding to one of the nodes in the pattern 20 is changed so that it determines that the node has been detected regardless of the actual lack of the node.

Each time the absence of one of the nodes is detected, the target partial program detecting unit 110 records information for identification of the node to obtain a set of absent nodes. As a result, the target partial program detecting unit 110 can compute the proportion of the instructions in the partial program corresponding to the other instructions included in the pattern 20 in all the instructions included in the pattern 20. Further, by means of this algorithm, the target partial program detecting unit 110 can detect an instruction sequence having two or more of the characteristics shown in FIGS. 2(*b*) to 2(*e*).

Subsequently, the instruction sequence transforming unit 120 transforms, in the partial program to be optimized, instructions other than those instructions corresponding to instructions included in the pattern 20 and those instructions having execution dependencies different from the pattern 20 so that dependencies between instructions included in the partial program 40 match the pattern 20 S420). The instruction sequence replacing unit 130 replaces the transformed partial pattern 50 with the target instruction sequence determined in accordance with the pattern to be replaced (S430).

It is not necessarily possible that all instruction sequences detected by the target partial program detecting unit 110 will be replaced with target instruction sequences. That is, in some cases, the instruction sequence transforming unit 120 fails to transform the partial program 40 and the instruction sequence replacing unit 130 fails to replace the instruction sequence.

Four examples of a process in which the compiler 10 is supplied with a program to be optimized and optimizes the program will be described successively.

FIRST EXAMPLE

Figure 5:
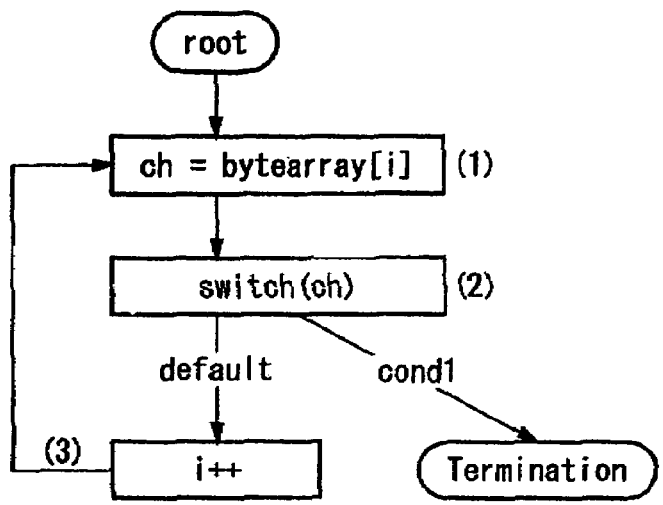
FIG. 5 shows a first example of the pattern 20 to be replaced and a target instruction template 30.

FIG. 5(*a*) shows the pattern 20 to be replaced in the first example.

Figure 16:
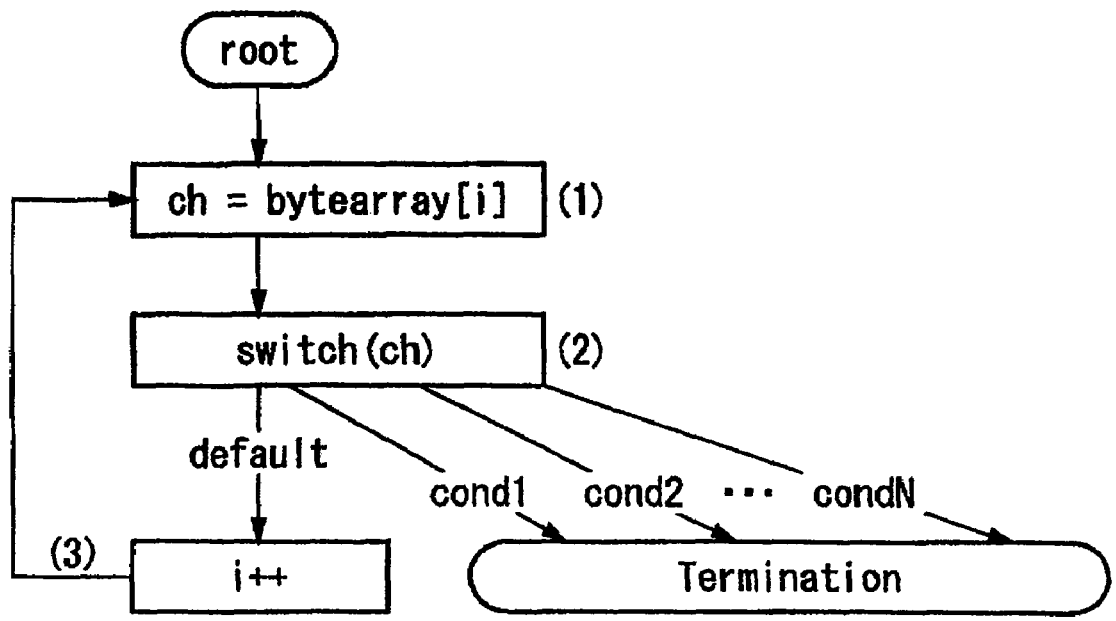
FIG. 16 is a control flow graph corresponding to processing according to a TRT instruction.

The pattern 20 is a pattern to be replaced for detection of an instruction sequence shown in FIG. 16. In the instruction sequence shown in FIG. 16, the destination of branching from a switch instruction (2) is variable among numbers from 2 to 256. It is, therefore, thought that there is a need to generate 255 patterns 20 having the corresponding number of branching destinations 2 to 256 in order to suitably detect the switch instruction. However, it is inefficient to compare the large number of patterns 20 and partial programs because a long processing time is required for the comparison therebetween.

Then, the target partial program detecting unit 110 detects partial programs to be optimized by using the illustrated pattern 20. This pattern 20 has, with respect to a multiple-branch instruction (e.g., switch instruction (2)) to hand over control to an external instruction out of the pattern 20 in a case where one of multiple conditions is satisfied, a representative edge representative of multiple control flows through which control is handed over from the multiple-branch instruction to the external instruction.

The target partial program detecting unit 110 determines that a partial program includes the corresponding multiple-branch instruction, if the dependence graph showing control flows of the partial program has an edge corresponding to the representative edge. That is, the target partial program detecting unit 110 determines that the multiple-branch instructions correspond to each other, on condition that the number of edges of the multiple-branch instruction of the partial program is larger than the number of edges of the multiple-branch instruction of the pattern 20.

FIG. 5(*b*) shows a target instruction sequence template 30 in the first example. This figure shows a program source code indicating details of processing according to instructions included in the target instruction sequence template 30. In actuality, the target instruction sequence template 30 may be described by means of a predetermined intermediate code or a machine language.

In the target instruction sequence template 30, a variable "bytearray" represents an address in a storage area in which a value with which comparison is made is stored by a TRT instruction. A variable "i", represents an index for scanning the storage area. The instruction sequence replacing unit 130 secures the storage area for storing a number of values equal to the value of the variable "bytearray", and stores in a variable "table" the address stored in the storage area. For example, when the value of index i in the "bytearray" storage area satisfies a condition for termination of the loop, the value of index i in the "table" storage area is a non-zero value.

Figure 6:
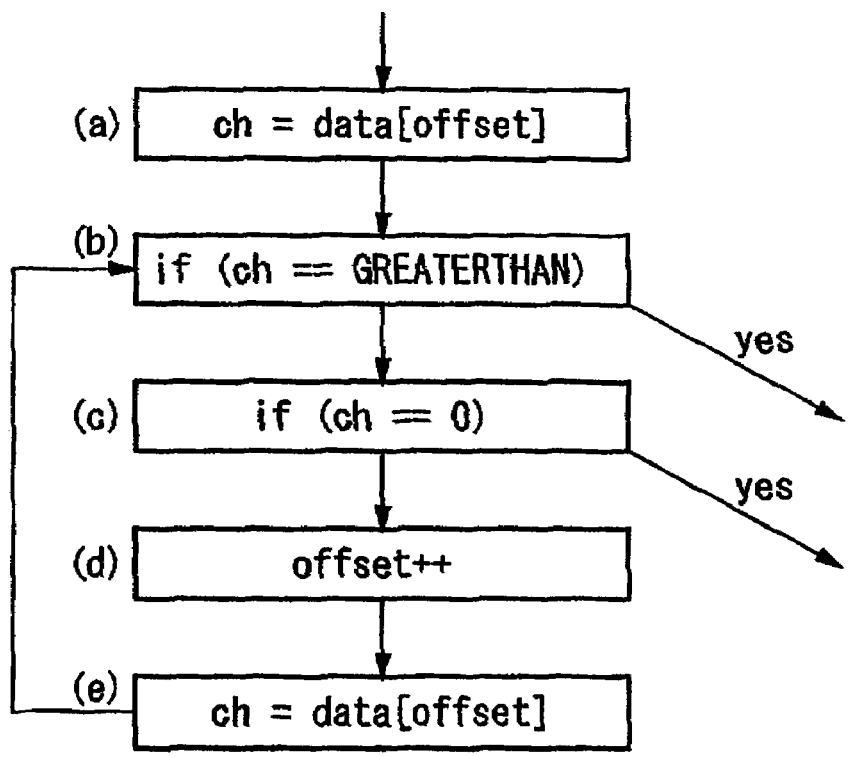
FIG. 6 shows a first example of the partial pattern 40 to be optimized by the compiler 10.

FIG. 6 shows a first example of the partial program 40 to be optimized by the compiler 10. The program shown in FIG. 6(*a*) is a source program representing details of processing in accordance with the partial program 40. FIG. 6(*b*) is a control flow graph of the partial program 40. According to the partial program 40, a storage area determined by a variable "data" is scanned in order and loop processing is terminated when a constant "GREATERTHAN" or a constant 0 is detected. When the constant 0 is detected, a return from a method call is made.

As is apparent from comparison between this figure and FIG. 5(*a*), the pattern 20 and the partial program 40 have different orders of processing according to instructions to read out the value from the storage area. More specifically, while the value is read out from the storage area by instruction (1) according to the pattern 20, the value is read out from the storage area by instruction (a) and instruction (e) according to the partial program 40. According to the conventional art, correspondence in the form between programs can be determined without considering a difference in variable name for example, but correspondence in form between programs cannot be determined if the placement of instructions is changed. That is, the partial program 40 shown in this figure cannot be detected as a program to be optimized.

In contrast, the compiler 10 in this embodiment is capable of detecting correspondence between instruction (1) in FIG. 5(*a*) and the instruction (a) in FIG. 6(*b*) and correspondence between instruction (1) and the instruction (e) in FIG. 6(*b*). The compiler 10 is also capable of detecting correspondence between instruction (2) in FIG. 5(*a*) and the instruction (b) in FIG. 6(b) and correspondence between instruction (2) and the instruction (c) in FIG. 6(b). Further, the compiler 10 is capable of detecting correspondence between instruction (3) in FIG. 5(a) and the instruction (d) in FIG. 6(b).

The instruction sequence transforming unit 120 obtains a detection result showing that instruction (b) and instruction (c) are successively executed and that instructions (b) and (c) are transformable into instruction (2) in FIG. 5(a). The instruction sequence transforming unit 120 also obtains a detection result showing that the pattern 20 and the partial program 40 have the same dependence of the variable ch. The instruction sequence transforming unit 120 further obtains a detection result showing that the pattern 20 and the partial program 40 have the same dependence with respect to the index variable in the storage area. The instruction sequence transforming unit 120 further obtains a detection result showing that the partial program 40 does not include an additional instruction in comparison with the pattern 20. If all the above-described conditions are satisfied, the instruction sequence replacing unit 130 replaces the partial program 40 with the target instruction sequence based on the pattern 20.

FIG. 7 shows the resultant partial program 60 in the first example. The instruction sequence replacing unit 130 generates a storage area indicated by the variable "table" when a target instruction sequence is generated. For example, if the value of index i in the variable "data" storage area is GREATERTHAN or 0, the value of index i in the "table" storage area is a non-zero value. The instruction sequence replacing unit 130 initializes other values in the "table" storage area to 0.

As is apparent from this processing, the instruction sequence replacing unit 130 can optimize the instruction sequence if determination as to whether or not the loop processing is terminated is made on the basis of the value of index i. Therefore, the target partial program detecting unit 110 may detect a partial program as the partial program 40, on condition that determination as to whether or not the loop processing is terminated is made on the basis of the value of index i, even in a case where the partial program and the pattern 20 have different switch instruction references. For example, in a case where a partial program includes an instruction "switch" (map1 [ch]), the target partial program detecting unit 110 may detect the partial program as the partial program 40, on condition that the array variable map1 corresponds to a constant array.

Processing in accordance with the resultant partial program 60 will be described. According to a while instruction (3) and a TRT instruction (5) in the resultant partial program 60, the computer scans on a 256 byte basis the storage area determined by the variable "data". The TRT instruction (5) can be executed at an extremely high speed in comparison with the process in which loop processing is repeated 256 times. Therefore, the speed of scanning of the storage area determined by the variable "data" can be increased. For example, in a case where 0 or GREATERTHAN is stored within initial 256 bytes in the storage area, instructions (1) to (9) are executed in this order. Thus, loop processing is not executed and, therefore, the efficiency is markedly high.

According to the first example, as described above, the instruction sequence replacing unit 130 can replace processing realized by two or more instructions such as a while instruction and a switch instruction with a TRT instruction which is one instruction for performing the same processing as that performed by multiple instructions.

As a modification of the first example, a case is conceivable in which the pattern 20 includes a nullcheck instruction for determining whether or not the value of the variable "bytearray" is null. For example, the nullcheck instruction is ordinarily used immediately before execution of instruction (1) each time instruction (1) is executed. The nullcheck instruction is used for the purpose of preventing readout of the value from an invalid address by instruction (1).

The value of bytearray is constant independently of repetition of the loop. Therefore the result of execution of the nullcheck instruction is the same independently of repetition of the loop. In such a case, the instruction sequence transforming unit 120 executes the nullcheck instruction out of the loop processing and, therefore, the instruction sequence replacing unit 130 can replace the loop processing from which the nullcheck instruction has been removed with a target instruction sequence.

SECOND EXAMPLE

Figure 8:
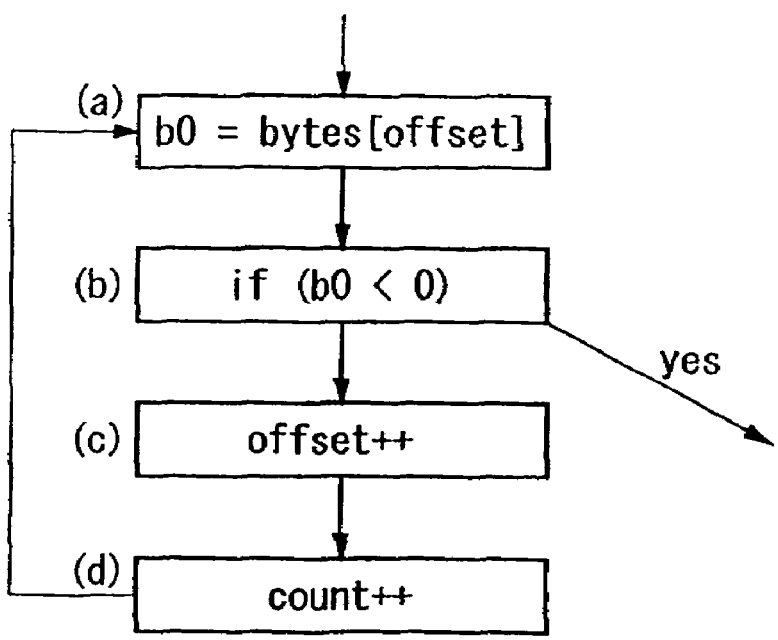
FIG. 8 shows a second example of the partial pattern 40 to be optimized by the compiler 10.

FIG. 8 shows a second example of the partial program 40 by the compiler 10. The program shown in FIG. 8(a) is a source program representing details of processing in accordance with the partial program 40 is shown. FIG. 8(b) is a control flow graph of the partial program 40 is shown. According to the partial program 40, the computer scans in order a storage area determined by a variable "bytes", with respect to the index indicated by a variable "offset". Loop processing is terminated when a negative value is detected.

In the partial program 40, loop processing has two induction variables: the variable "offset" and a variable "count". That is, the partial program 40 and the pattern 20 shown in FIG. 5(a) apparently differ in program structure from each other. Therefore, the conventional compiler cannot recognize the partial program 40 as a program to be optimized.

According to the compiler 10 in this embodiment, the target partial program detecting unit 110 can detect a partial program as the partial program 40 even if the partial program has an additional instruction in comparison with the pattern 20. More specifically, the target partial program detecting unit 10 can obtain a detection result showing that instruction (1) in FIG. 5(b) corresponds to instruction (a) in FIG. 8(b), a detection result showing that instruction (2) in FIG. 5(b) corresponds to instruction (b) in FIG. 8(b), and a detection result showing that instruction (3) in FIG. 5(b) corresponds to instruction (c) in FIG. 6(b).

In this case, the instruction sequence transforming unit 120 generates new loop processing to execute an additional instruction. Consequently, the instruction sequence replacing unit 130 can replace instructions other than the additional instruction in the program to be optimized with a target instruction sequence. The compiler 10 may further optimize the newly generated loop processing. That is, the compiler 10 can optimize the newly generated loop processing into processing for computing the value of the variable "count" from the value of the variable "offset".

FIG. 9 shows the resultant partial program 60 in the second example. The instruction sequence replacing unit 130 generates a storage area indicated by the variable "table" when a target instruction sequence is generated. For example, if the value of index i in the variable "bytes" storage area is a negative value, the value of index i in the "table" storage area is a non-zero value. The instruction sequence replacing unit 130 initializes other values in the "table" storage area to 0.

Processing in accordance with the resultant partial program 60 will be described. According to a while instruction (3) and a TRT instruction (5) in the resultant partial program 60, the computer scans on a 256 byte basis the storage area determined by the variable "bytes". The TRT instruction (5) can be executed at an extremely high speed in comparison with the process in which loop processing is repeated 256 times. Therefore, the speed of scanning of the storage area determined by the variable "bytes" can be increased. For example, in a case where a negative value is stored within initial 256 bytes in the storage area, instructions (1) to (9) are executed in this order. Thus, loop processing is not executed and, therefore, the efficiency is markedly high.

THIRD EXAMPLE

FIG. 10 shows a third example of the partial program 40 by the compiler 10. This figure shows a source program representing details of processing in accordance with the partial program 40. According to the partial program 40, the computer scans in order a storage area determined by a variable "bytes" with respect to the index indicated by a variable "offset". Loop processing is terminated when a negative value is detected. In this loop processing, a storage area determined by a variable "a" is initialized in order from the top.

In the partial program 40, loop processing has two induction variables: the variable "offset" and a variable "count". That is, the partial program 40 and the pattern 20 shown in FIG. 5(a) apparently differ in program structure from each other. In this case, the conventional compiler cannot recognize the partial program 40 as a program to be optimized.

According to the compiler 10 in this embodiment, the target partial program detecting unit 110 can detect a partial program as the partial program 40 even if the partial program has an additional instruction in comparison with the pattern 20. Accordingly, the instruction sequence transforming unit 120 divides the loop processing of the partial program 40 into two loop processings in which the additional instruction and the instruction sequence other than the additional instruction are respectively executed.

FIG. 11 shows the resultant partial program 60 in the third example. The program shown in FIG. 11(a) is the resultant partial program 60 including a target instruction sequence substituted by the instruction sequence replacing unit 130. A while instruction and a conditional branch instruction are replaced with a TRT instruction, as are those shown in FIG. 9. The additional instruction to initialize the storage area determined by the variable "a" is executed in loop processings (2) and (3) newly generated.

FIG. 11(b) shows the resultant partial program 60 further optimized by the compiler 10. As shown in this figure, the compiler 10 may optimize the loop processing that initializes the storage area determined by the variable "a" into an XC instruction. According to the XC instruction, a storage area of a predetermined size can be initialized by a predetermined value. The XC instruction is executed at an extremely high-speed in comparison with the processing that initializes in order a 256 byte storage area in a loop processing manner. Therefore, the program to be optimized can be optimized further effectively.

The XC instruction is capable of initializing a storage area of a size designated by a constant operand. For example, instruction (1) is an XC instruction for initializing a storage area of a constant size of 256 bytes. Further, according to the EXECUTE instruction in accordance with S/390 provided by IBM Corporation, a value designated by a constant operand can be changed during execution of a program (see pp. 7-108 of Non-Patent Document 4). Thus, the XC instruction is substantially capable of initializing a storage area of a size designated by a register. For example, instruction (3) in this figure represents an XC instruction such that a constant operand which designates the size of a storage area to be initialized is changed to the value of a variable T_inccount by the EXECUTE instruction.

FOURTH EXAMPLE

Figure 12:
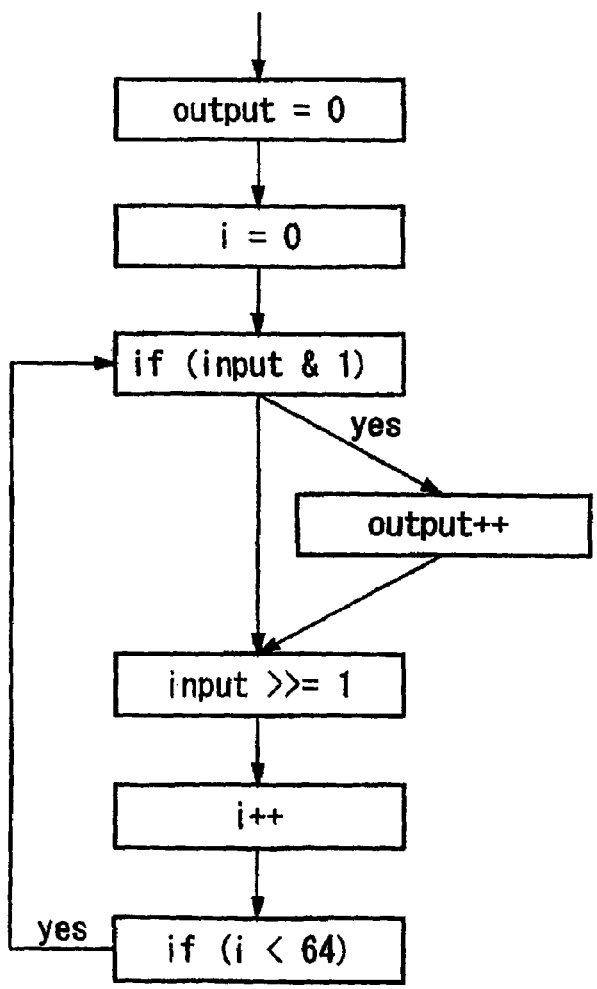
FIG. 12 shows a fourth example of the partial pattern 40 to be optimized by the compiler 10.

FIG. 12 shows a fourth example of the partial program 40 by the compiler 10. The program shown in FIG. 12(a) is a source program representing details of processing in accordance with the partial program 40. FIG. 12(b) is a control flow graph of the partial program 40. According to the partial program 40, the computer counts the number of bits 1 in data stored in a variable "input" and stores the count value in a variable "output". This program is not efficient since the processing time is increased in proportion to the number of bits in the variable "input".

FIG. 13 shows the resultant partial program 60 in the fourth example. The instruction sequence replacing unit 130 replaces the partial program 40 shown in FIG. 12 with the resultant partial program 60 shown in FIG. 13. According to the resultant partial program 60, the computer can execute the number of bits 1 in the variable "input" at a higher speed in comparison with the partial program 40. In this way, the instruction sequence replacing unit 130 may perform not only processing for replacement with a particular instruction but also processing for replacing an algorithm. That is, the instruction sequence replacing unit 130 may replace an instruction sequence for processing based on an algorithm requiring a longer processing time with an instruction sequence for processing based on a different algorithm requiring a shorter processing time.

FIG. 14 is a diagram for explaining the effect of this embodiment. Comparison between the speed of the partial program 40 shown in FIG. 6 and the speed of the resultant partial program 60 shown in FIG. 7 was made. The table in FIG. 14 shows the rate at which the speed of the resultant partial program 60 is increased relative to that of the partial program 40. While the increase rate with respect to 256 data items are shown in this figure, it has also been confirmed that the increase rate is further improved with respect to a number of data items exceeding 256.

It can be understood that, as shown in the figure, the efficiency of execution of the program can be improved by optimization in a case where eight or more data items on average are scanned. That is, for example, the compiler 10 may select and optimize only loop processing highly probable to scan eight or more data items to improve the efficiency of execution of the entire program.

Figure 15:
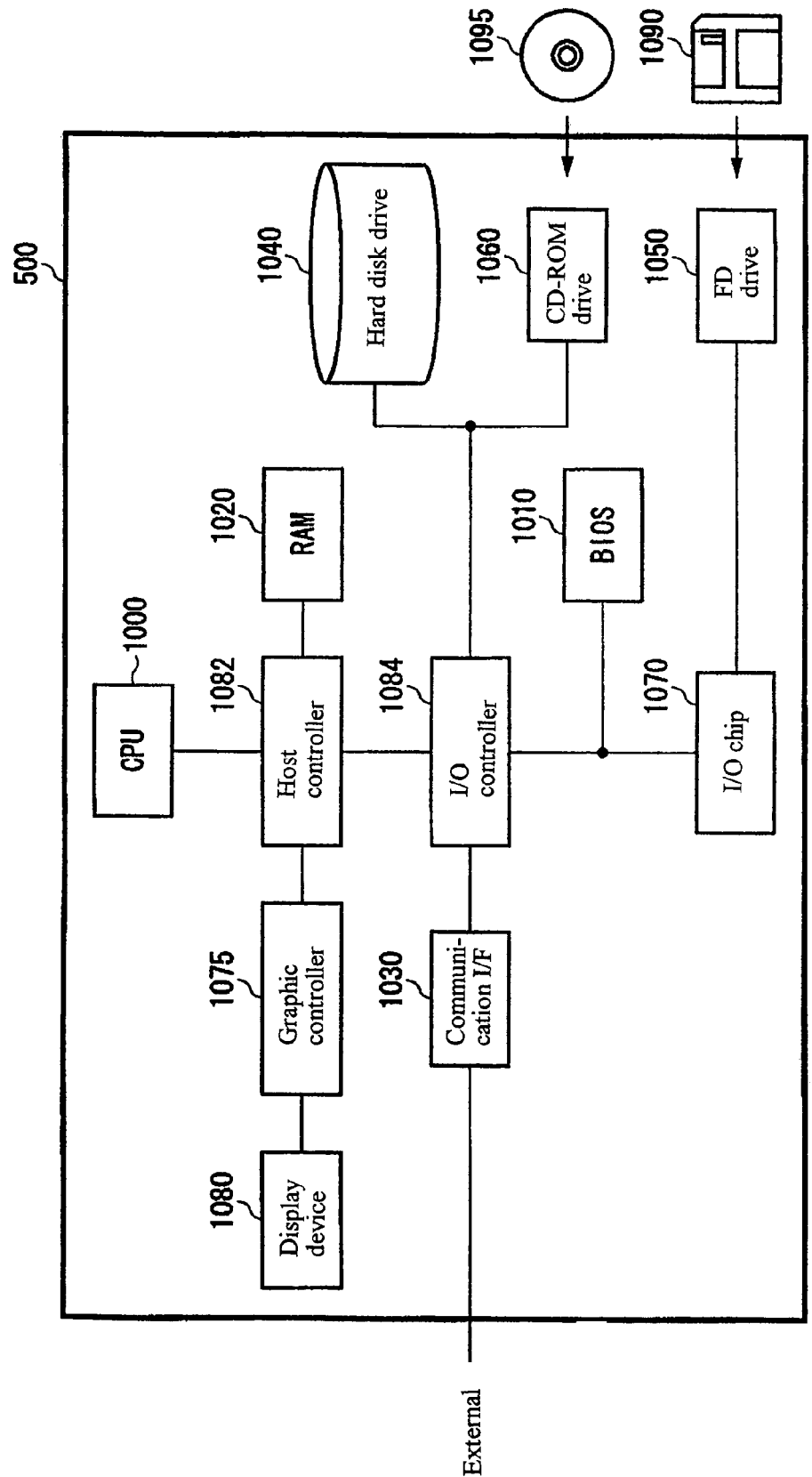
FIG. 15 shows an example of the hardware configuration of a computer 500 which functions as the compiler 10.

FIG. 15 shows an example of a hardware configuration of a computer 500 which functions as the compiler 10. The computer 500 has a CPU peripheral section having a CPU 1000, a RAM 1020 and a graphic controller 1075 connected to each other by a host controller 1082, an input/output section having a communication interface 1030, a hard disk drive 1040 and a CD-ROM drive 1060 connected to the host controller 1082 by an input/output controller 1084, and a legacy input/output section having a BIOS 1010, a flexible disk drive 1050 and an input/output chip 1070 connected to the input/output controller 1084.

The host controller 1082 connects the RAM 1020, and the CPU 1000 and the graphic controller 1075, which access the RAM 1020 at a high transferrate. The CPU 1000 operates on the basis of programs stored in the BIOS 1010 and the RAM 1020, and controls each component. The graphic controller 1075 obtains image data generated, for example, by the CPU 1000 on a frame buffer provided in the RAM 1020, and displays the image data on a display device 1080. Alternatively, the graphic controller 1075 may contain therein a frame buffer for storing image data generated by the CPU 1000 for example.

The input/output controller 1084 connects the host controller 1082, the communication interface 1030, which is an input/output device of a comparatively high speed, the hard disk drive 1040 and the CD-ROM drive 1060. The communication interface 1030 performs communication with an external unit via a network. The hard disk drive 1040 stores programs and data used by the computer 500. The CD-ROM drive 1060 reads a program or data from a CD-ROM 1095 and provides the read program or data to the input/output chip 1070 via the RAM 1020.

To the input/output controller 1084, the BIOS 1010 and input/output devices of a comparatively low speed, i.e., the flexible disk drive 1050 and the input/output chip 1070 or the like are also connected. The BIOS 1010 stores programs including a boot program executed by the CPU 1000 at the time of startup of the computer 500 and programs dependent on the hardware of the computer 500. The flexible disk drive 1050 reads a program or data from a flexible disk 1090 and provides the read program or data to the input/output chip 1070 via the RAM 1020. The input/output chip 1070 connects the flexible disk 1090 and various input/output devices, for example, through a parallel port, a serial port, a keyboard port, a mouse port, etc.

A program provided to the computer 500 is provided by a user in a state of being stored on a recording medium, such as the flexible disk 1090, the CD-ROM 1095, or an IC card. The program is read out from the recording medium, installed in the computer 500 via the input/output chip 1070 and/or the input/output controller 1084, and executed in the computer 500. Operations which the computer 500 is made by the this program, e.g., the compiler program to perform are the same as the operations in the computer 500 described above with reference to FIGS. 1 to 14. Therefore, description of the operations will not be repeated.

The above-described program may be stored on an external storage medium. As the recording medium, an optical recording medium such as a DVD or a PD, a magneto-optic recording medium such as an MD, a tape medium, a semiconductor memory such as an IC card, or the like can be used as well the flexible disk 1090 and the CD-ROM 1095. Also, a storage device such as a hard disk, a RAM or the like provided in a server system connected to a special-purpose communication network or the Internet may be used as the recording medium to provide the program to the computer 500 via the network.

While the present invention has been described with respect to the embodiment thereof, the technical scope of the present invention is not limited to the scope described above with respect to the embodiment. It is apparent to those skilled in the art that various changes and medications can be made in the above-described embodiment. It is apparent from the description in the appended claims that other embodiments of the invention provided by making such changes and modifications are also included in the technical scope of the present invention.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An optimization method that optimizes programs for a specific computer architecture, wherein, a pattern for multiple predetermined instructions is used to replace one of a plurality of partial programs having first instructions, within programs to be optimized based on the pattern, and at least a part of the one of the plurality of partial programs detected is replaced and optimized with second instructions corresponding to the pattern, wherein the second instructions contain at least one specific computer architecture instruction, the method comprising:

detecting the partial program within a series of said first instructions within programs to be optimized, such that the series of first instructions has at least one absent instruction that is included in the pattern but not within the partial program, and detecting the partial program within the series of the first instructions on condition that a ratio of the first instructions corresponding to all the first instructions included in the pattern in the partial program is equal to or greater than a predetermined reference ratio;

wherein based on the detecting of the partial program and the condition, replacing a part of the one of the plurality of partial programs which includes replacing the series of first instructions that have been transformed in the partial program with the second instructions;

transforming instructions included in the series of first instructions corresponding to the pattern by adding the absent instruction to the partial program, and further adding a pair of cancel instructions for maintaining processing results achieved by the partial program, wherein adding the pair of cancel instructions further comprises adding a first cancel instruction of the pair of cancel instructions before the absent instruction and adding a second cancel instruction after the absent instruction; and wherein adding the first and second cancel instructions further includes adding the first cancel instruction before a save instruction, wherein the first cancel instruction uses the save instruction to save a value in a storage area, and wherein adding the second cancel instruction includes adding a recovery instruction to be invoked prior to the second cancel instruction to recover the value saved in the storage area, where the saved value is used to restore control flow of the transformed partial program from the point where the absent instruction is added.

* * * * *